United States Patent
Johnson

(10) Patent No.: US 10,710,089 B2
(45) Date of Patent: Jul. 14, 2020

(54) SYSTEM AND METHOD FOR THE COMMINUTION AND HARVESTING OF TREES AND BRUSH TYPE VEGETATION

(71) Applicant: Henry Johnson, Bryan, TX (US)

(72) Inventor: Henry Johnson, Bryan, TX (US)

( * ) Notice: Subject to any disclaimer, the term of this patent is extended or adjusted under 35 U.S.C. 154(b) by 1204 days.

(21) Appl. No.: 14/851,558

(22) Filed: Sep. 11, 2015

(65) Prior Publication Data

US 2016/0073594 A1   Mar. 17, 2016

Related U.S. Application Data

(60) Provisional application No. 62/049,083, filed on Sep. 11, 2014.

(51) Int. Cl.
*B02C 4/02*       (2006.01)
*A01G 23/093*  (2006.01)
(Continued)

(52) U.S. Cl.
CPC .............. *B02C 4/02* (2013.01); *A01G 23/093* (2013.01); *B02C 4/30* (2013.01); *B02C 18/2216* (2013.01)

(58) Field of Classification Search
CPC ......... B02C 18/2216; B02C 4/02; B02C 4/30; A01G 23/093; A01G 3/0408;
(Continued)

(56) References Cited

U.S. PATENT DOCUMENTS 977,918  A  *  12/1910  Wolfenden ................ B02C 4/02
                                                                        241/112
2,504,403  A  *  4/1950  Finley ................ B62D 49/0607
                                                                        180/213
(Continued)

FOREIGN PATENT DOCUMENTS

DE    202007007213 U1    8/2007
DE    102005049716 B4    9/2007
(Continued)

OTHER PUBLICATIONS

Google search—https://dictionary.cambridge.org/us/dictionary/english/prong (Year: 2015).*

*Primary Examiner* — Shelley M Self
*Assistant Examiner* — Smith Oberto Bapthelus
(74) *Attorney, Agent, or Firm* — William H. Quirk; Jesse L. Frizzell; Rosenthal Pauerstein Sandoloski Agather, LLP

(57) ABSTRACT

A device for comminuting whole trees or brush type vegetation comprising a set of more than two rotatable substantially horizontally oriented comminution drum assemblies; said set of rotatable comminution drum assemblies being constructed and arranged in an angular orientation so that the uppermost rotatable comminution drum assembly in said set of more than two substantially horizontally oriented comminution drum assemblies first engages the top portion of the whole tree or brush type vegetation and the remaining rotatable comminution drum assemblies in said set of more than two substantially horizontally oriented comminution drum assemblies sequentially engage lower portions of the whole tree or brush type vegetation that exist immediately below the portions that are comminuted by each successive comminution drum assembly.

10 Claims, 17 Drawing Sheets

(51) Int. Cl.
*B02C 4/30* (2006.01)
*B02C 18/22* (2006.01)

(58) Field of Classification Search
CPC .... A01G 3/0426; A01G 3/0435; A01G 3/085; A01G 3/088; A47J 43/25
USPC ............ 241/101.5, 151.1, 151.2, 260.1, 154; 56/328.1
See application file for complete search history.

(56) References Cited

U.S. PATENT DOCUMENTS

| | | | |
|---|---|---|---|
| 2,537,404 A | 1/1951 | Garretson | |
| 2,843,165 A * | 7/1958 | Sherron | A01G 23/091 144/208.5 |
| 2,894,697 A * | 7/1959 | Panning | D21B 1/08 225/97 |
| 2,925,703 A | 2/1960 | Atmore | |
| 3,121,987 A | 2/1964 | Fitzhugh | |
| 3,497,321 A * | 2/1970 | Meder | B01J 2/22 100/155 R |
| 3,507,101 A * | 4/1970 | Bernshausen | A01D 46/24 56/1 |
| 3,651,845 A | 3/1972 | Propst | |
| 3,696,817 A * | 10/1972 | Bonner, Jr. | A24B 5/10 131/311 |
| 3,827,222 A * | 8/1974 | Toti | A01D 46/28 56/330 |
| 3,926,378 A * | 12/1975 | Ryan | A01D 90/105 241/101.76 |
| 3,955,765 A | 5/1976 | Gaitten | |
| 3,972,484 A * | 8/1976 | Ryan | A01F 29/005 241/154 |
| 3,979,074 A * | 9/1976 | White | A01F 29/005 241/30 |
| 3,996,980 A | 12/1976 | Pallari | |
| 4,083,501 A * | 4/1978 | Ryan | A01F 29/00 241/101.762 |
| 4,109,690 A | 8/1978 | Berg | |
| 4,109,875 A * | 8/1978 | Condarco | A01F 29/00 19/80 R |
| 4,158,945 A | 6/1979 | Burke | |
| 4,207,726 A | 6/1980 | Lippl | |
| 4,212,148 A * | 7/1980 | Brownlee | A01D 46/005 56/328.1 |
| 4,232,719 A | 11/1980 | Payton | |
| 4,236,554 A | 12/1980 | Nicholson | |
| 4,338,985 A * | 7/1982 | Smith | A01G 23/093 144/337 |
| 4,478,520 A * | 10/1984 | Cobey | A01C 3/00 366/325.2 |
| 4,537,362 A | 8/1985 | Zuloaga | |
| 4,543,775 A * | 10/1985 | Horn | A01G 3/0408 56/235 |
| 4,609,050 A * | 9/1986 | Jacobs | A01D 25/048 171/101 |
| 4,690,224 A | 9/1987 | Shwez | |
| 4,703,897 A * | 11/1987 | Beisner | B02C 4/02 241/152.2 |
| 4,777,787 A * | 10/1988 | Warren | A01G 3/0435 47/4 |
| 4,860,808 A | 8/1989 | Bussy | |
| 5,092,422 A * | 3/1992 | Hood, Jr. | A01B 63/00 172/306 |
| 5,253,467 A | 10/1993 | Sims | |
| 5,287,687 A * | 2/1994 | Urich | A01D 46/00 56/327.1 |
| 5,305,972 A * | 4/1994 | Hancocks | A01G 23/093 144/24.13 |
| 5,385,083 A * | 1/1995 | Toyokura | B02C 9/04 241/101.5 |
| 5,452,861 A * | 9/1995 | Faccia | A01F 25/2027 241/101.72 |
| 5,467,585 A | 11/1995 | Gagnon | |
| 5,694,753 A * | 12/1997 | Dellinger | A01G 3/08 56/234 |
| 5,745,947 A * | 5/1998 | Liu | E01H 1/106 15/82 |
| 6,659,378 B2 * | 12/2003 | Di Anna | A01G 3/002 241/101.77 |
| 6,722,593 B1 * | 4/2004 | Dobozy | B29B 17/02 241/159 |
| 6,860,093 B2 * | 3/2005 | Scordilis | A01D 34/863 56/15.2 |
| 6,945,292 B1 | 9/2005 | Giles et al. | |
| 7,028,610 B1 * | 4/2006 | Ralicki | B02C 19/22 100/145 |
| 7,373,960 B1 * | 5/2008 | Westbrook | A01G 23/093 144/208.3 |
| 7,410,004 B2 | 8/2008 | Meier | |
| 7,975,735 B2 | 7/2011 | Bergeron et al. | |
| 8,091,328 B2 | 1/2012 | Teetaert et al. | |
| 8,112,978 B1 * | 2/2012 | Dyal | A01G 3/04 56/233 |
| 8,905,343 B2 | 12/2014 | Gaudreault et al. | |
| 2003/0062435 A1 | 4/2003 | Gross et al. | |
| 2003/0126849 A1 * | 7/2003 | Scott | A01G 3/08 56/235 |
| 2005/0127218 A1 * | 6/2005 | Demske | A61J 7/0007 241/169 |
| 2007/0029421 A1 * | 2/2007 | Potts | B02C 4/08 241/235 |
| 2007/0201958 A1 * | 8/2007 | van Houten | B02C 18/18 407/53 |
| 2008/0060336 A1 * | 3/2008 | Bonadeo | A01D 46/28 56/330 |
| 2008/0072997 A1 * | 3/2008 | Thompson | A01G 23/093 144/4.1 |
| 2009/0019826 A1 * | 1/2009 | Rigney | A01D 41/00 56/13.5 |
| 2009/0020637 A1 * | 1/2009 | Raaz | B02C 4/02 241/143 |
| 2009/0120050 A1 * | 5/2009 | Constans | A01D 46/005 56/328.1 |
| 2010/0050585 A1 * | 3/2010 | Amaro | A01D 46/24 56/13.5 |
| 2011/0233315 A1 * | 9/2011 | Smith | B02C 4/02 241/229 |
| 2013/0014481 A1 * | 1/2013 | Dow | A01B 73/00 56/13.5 |
| 2013/0061984 A1 * | 3/2013 | Helmsderfer | A01G 23/06 144/24.12 |
| 2013/0193245 A1 * | 8/2013 | Futa | B29B 17/0404 241/27 |
| 2016/0073594 A1 * | 3/2016 | Johnson | A01G 23/093 241/101.5 |

FOREIGN PATENT DOCUMENTS

| | | |
|---|---|---|
| EP | 0562406 B1 | 6/1997 |
| EP | 1632132 B1 | 12/2009 |
| EP | 2286656 B1 | 3/2013 |
| WO | 1988001130 A1 | 2/1988 |
| WO | 2007066161 A1 | 6/2007 |
| WO | 2009103269 A1 | 8/2009 |
| WO | 2010129986 A1 | 11/2010 |
| WO | 2012038787 A1 | 3/2012 |

* cited by examiner

SYSTEM AND METHOD FOR THE COMMINUTION AND HARVESTING OF TREES AND BRUSH TYPE VEGETATION

CROSS REFERENCE TO RELATED APPLICATION

This application claims the benefit of Provisional U.S. Patent Application No. 62/049,083 filed Sep. 11, 2014.

STATEMENT REGARDING FEDERALLY FUNDED SPONSORED RESEARCH

The invention described in this patent application was not the subject of federally sponsored research or development.

FIELD

The disclosed system and method generally relates to agriculture, and more particularly, the disclosed system and method relates to comminuting whole trees and brush type vegetation where they grow and the collection of the comminuted plants for further use.

BACKGROUND

Numerous tree and brush type species exist that are removed by agriculturalists, recreational land owners, public land owners, utility companies, oil and gas companies, and land developers, among others. One such method of removal is the comminution of the trees or brush in place through the use of some type of shredding mechanism powered by a vehicle, for the purpose of turning whole trees or brush type vegetation into mulch. Additionally, some shredding systems also gather the mulch produced for later use.

Due to the nature of the vegetation that is being removed, as well as limitations associated with prior art systems, the process of removing and shredding trees or brush-type vegetation, is arduous, time-consuming, and costly.

SUMMARY

The disclosed system and method for effectively, efficiently and economically comminuting whole trees and brush type vegetation includes a device comprising a set of more than two rotatable substantially horizontally oriented comminution drum assemblies; said set of rotatable comminution drum assemblies being constructed and arranged in an angular orientation so the uppermost rotatable substantially horizontally oriented comminution drum assembly in said set of more than two rotatable substantially horizontally oriented comminution drum assemblies first engages the top portion of the whole tree or brush type vegetation and the remaining rotatable comminution drum assemblies in said set of more than two rotatable substantially horizontally oriented comminution drum assemblies sequentially engage the lower portion of the whole tree or brush type vegetation that exists immediately below the portions that are comminuted by each successive rotatable substantially horizontally oriented comminution drum assembly.

In a preferred embodiment the device including the set of more than two rotatable substantially horizontally oriented comminution drum assemblies is mounted within a self-propelled straddle frame assembly. The self-propelled straddle frame assembly may include a system for managing the mulch produced by the set of rotatable horizontally oriented comminution drum assemblies.

BRIEF DESCRIPTION OF DRAWING FIGURES

The embodiments of the disclosed system and method shall be more clearly understood with reference to the following detailed description of the embodiments of the disclosed system and method taken in conjunction with the accompanying figures, in which.

Figure 15:
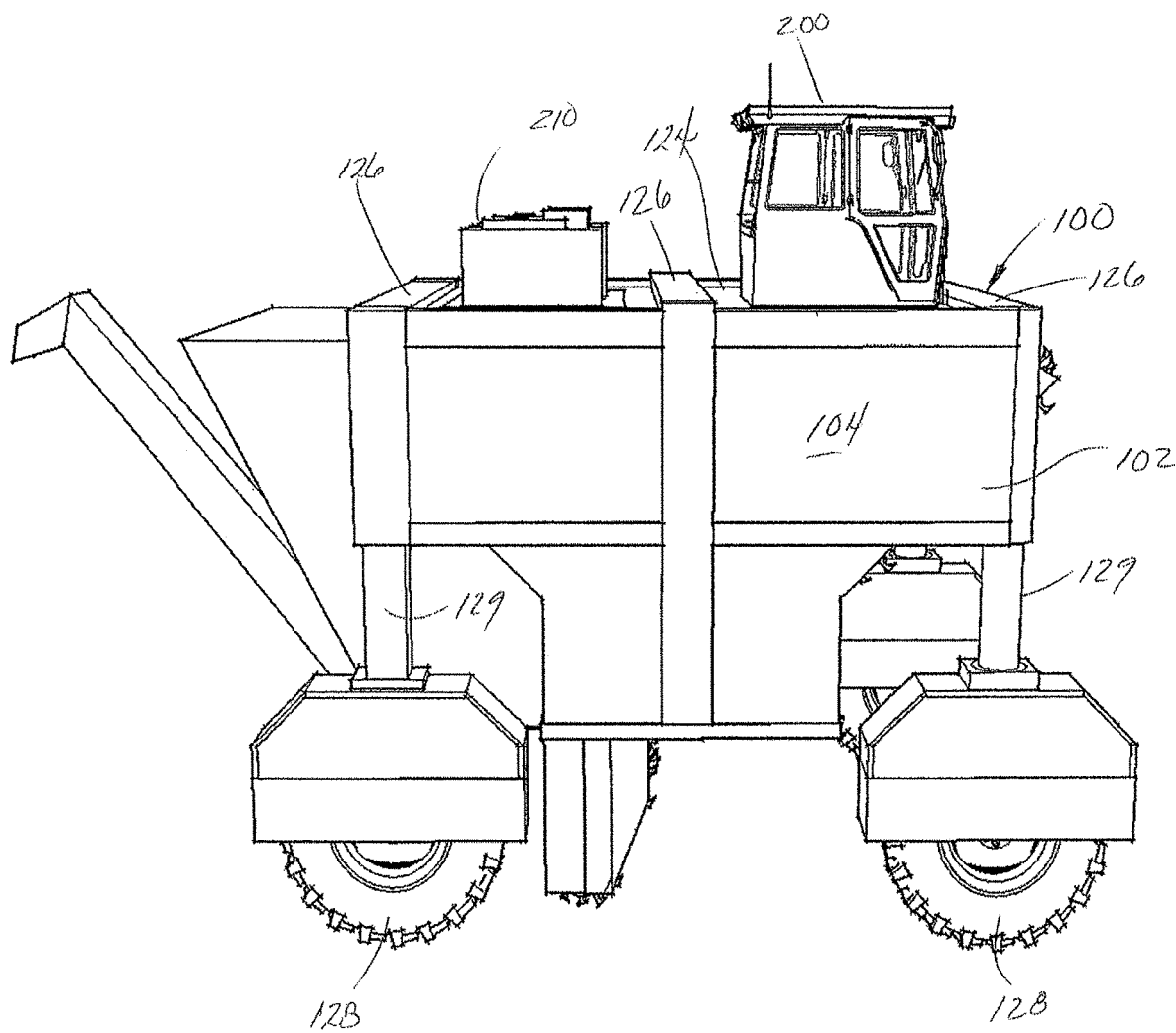
Figure 16:
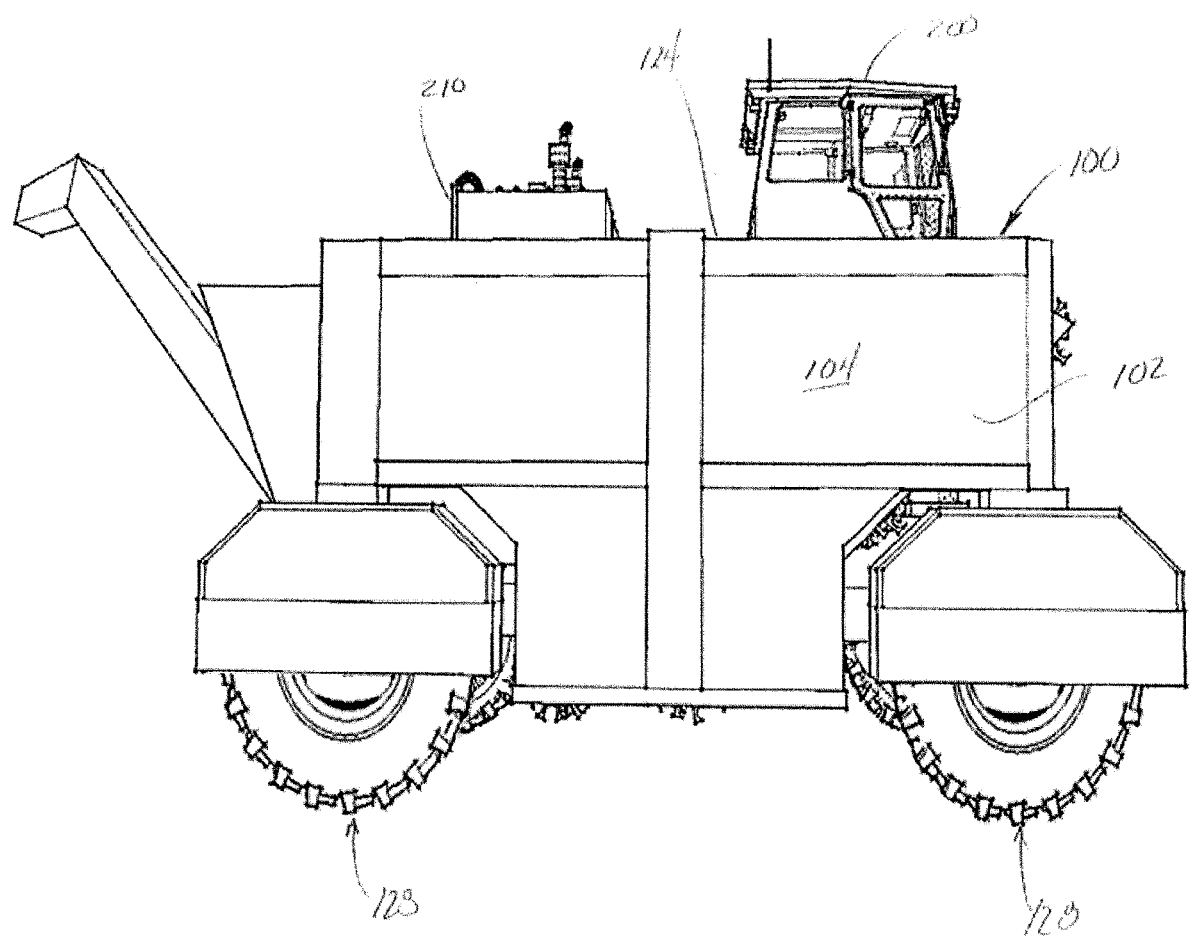
Figure 17:
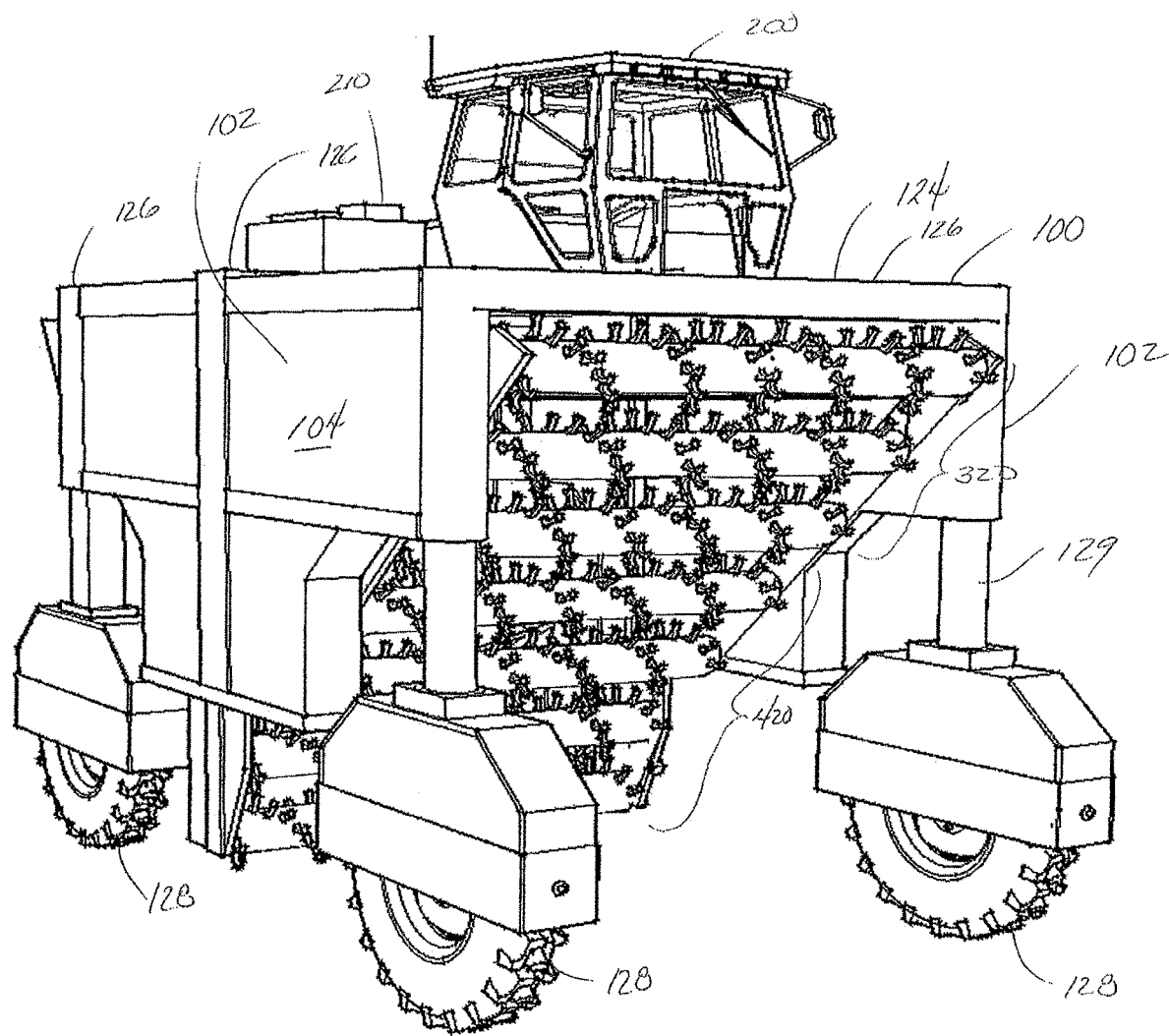
Figure 18:
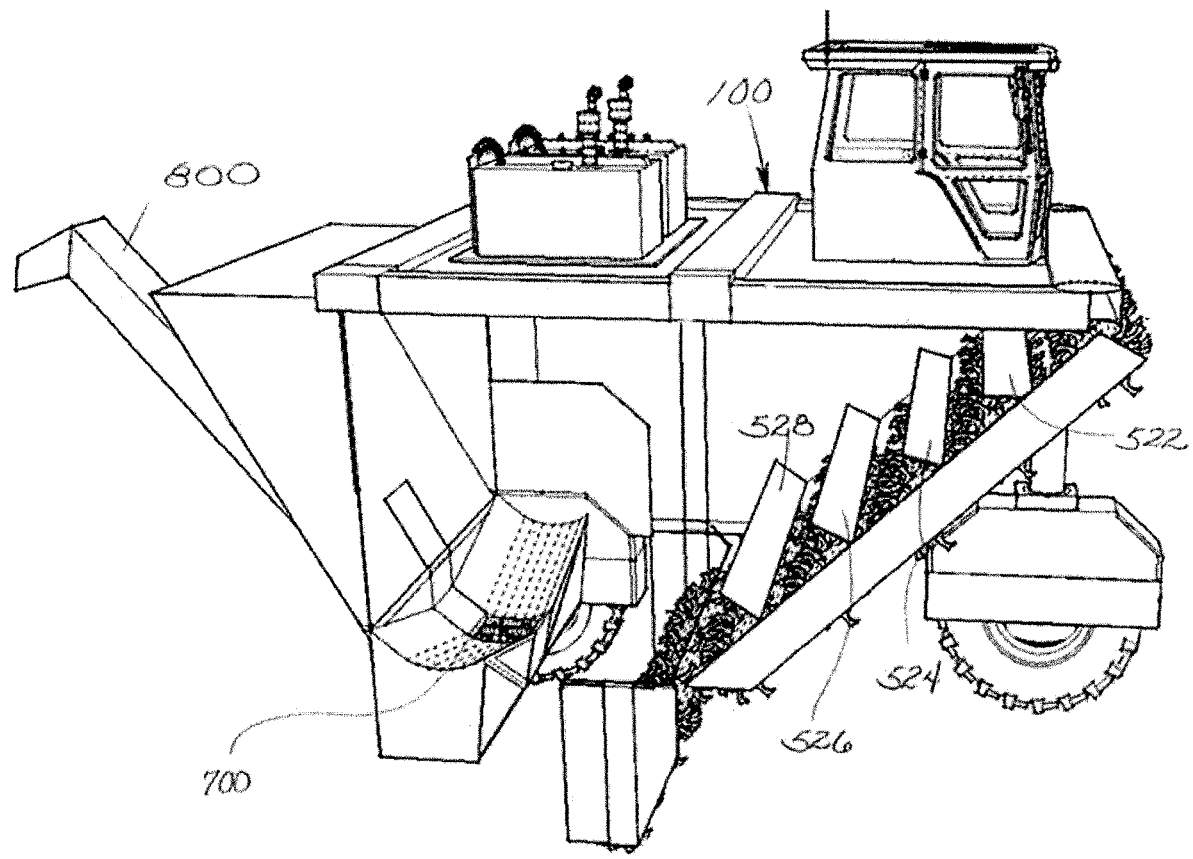
Figure 19:
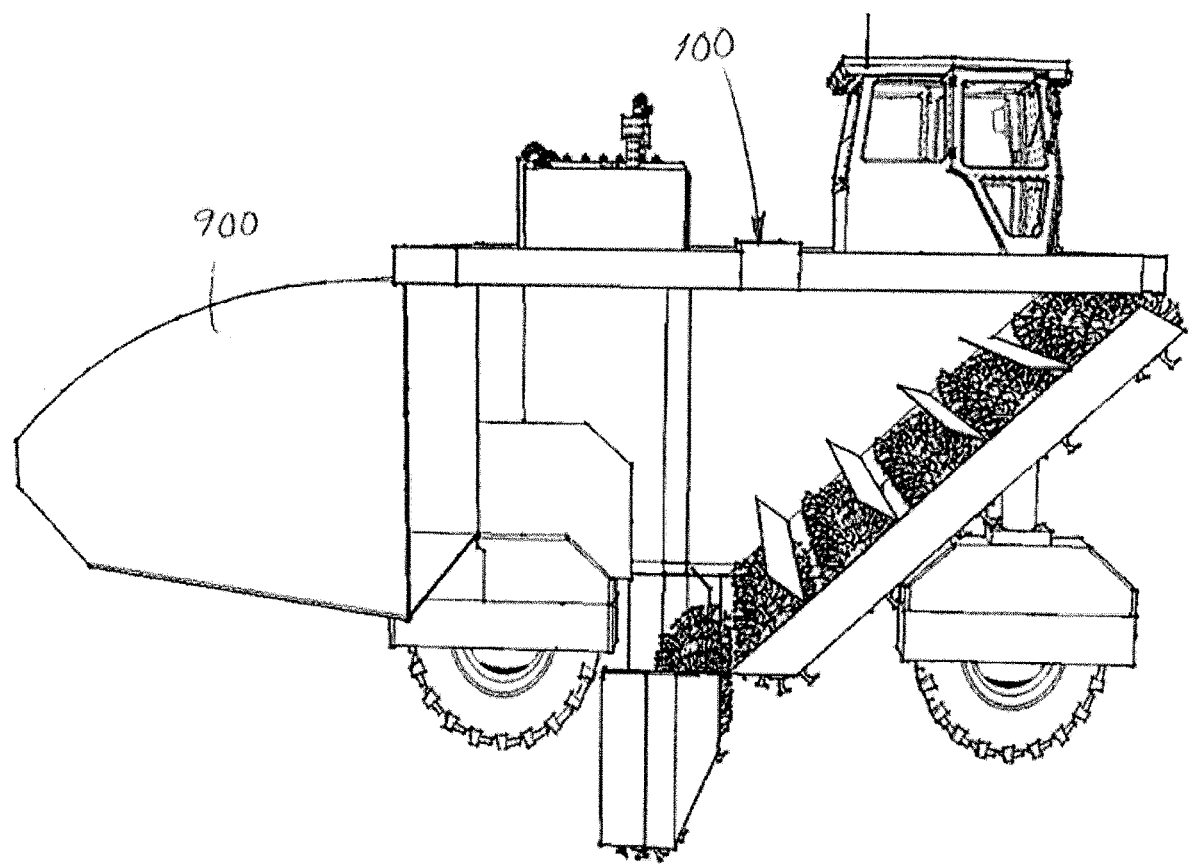
Figure 20:
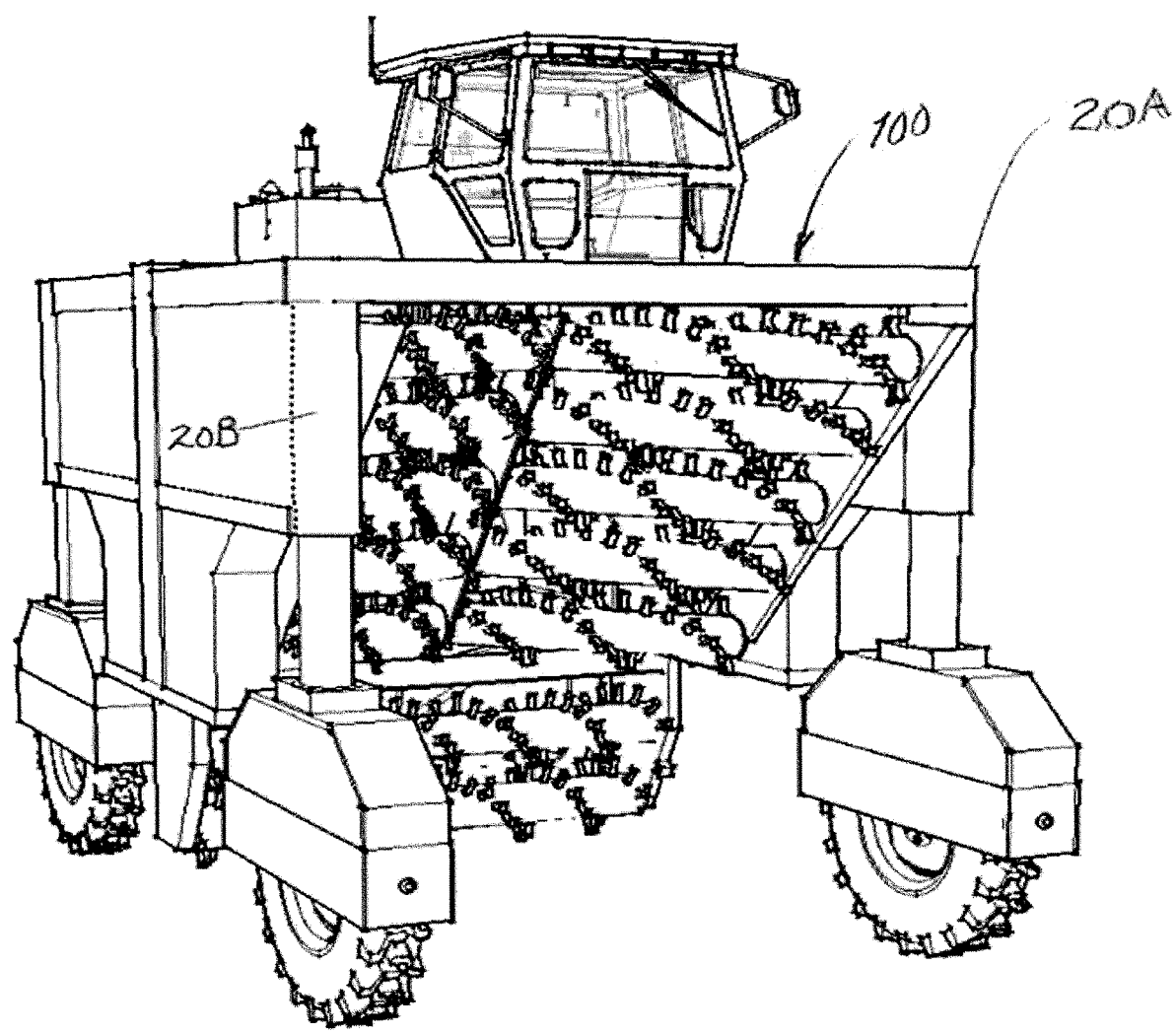

FIG. 15 is a side elevational view, in partial perspective, of the preferred embodiment of the present invention comprised of a self-propelled straddle frame assembly including the set of more than two substantially horizontally oriented comminution drum assemblies and a covered elevator assembly at the rear of the self-propelled straddle frame assembly for conveying mulch away from the self-propelled straddle frame assembly;

FIG. 16 is a side elevational view, in partial perspective, showing the strut portions of the self-propelled straddle frame assembly collapsed;

FIG. 17 is a perspective view showing the use of multiple sets of more than two rotatable substantially horizontally oriented comminution drum assemblies within the self-propelled straddle frame assembly;

FIG. 18 is a perspective view of the interior of an alternate embodiment of the self-propelled straddle frame assembly including deflector plates between the comminution drum assemblies and an additional mulching device at the rear of the self-propelled straddle frame assembly;

FIG. 19 is a side elevational view, in partial perspective, of the interior of an alternate embodiment of the self-propelled straddle frame assembly including a mulch collection container at the rear portion; and FIG. 20 is a perspective view of an alternate embodiment of the self-propelled adjustable straddle frame assembly wherein the set of more than two substantially horizontal rotatable comminution drum assemblies has been divided vertically and angled towards the rear of the straddle frame to form a V-shaped assembly.

DESCRIPTION OF THE EMBODIMENTS

Figure 1:
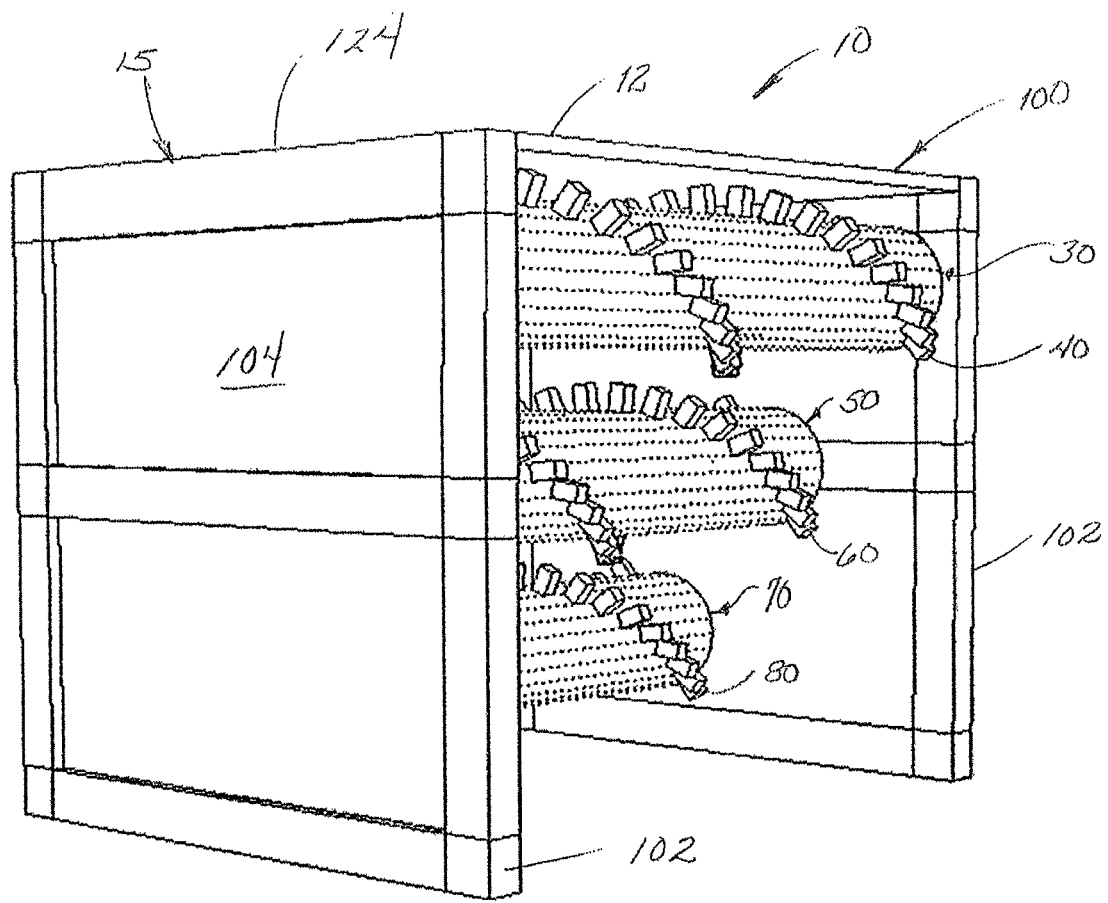
FIG. 1 is a perspective view showing the straddle frame assembly and the comminution drum assemblies therein

The disclosed system and method 10 for the comminution of whole trees and brush type vegetation, as shown in FIG. 1, is based upon an arrangement of more than two comminution drum assemblies 30, 50, 70 within a straddle frame 12. This arrangement of more than two comminution drum assemblies 30, 50, 70 enables the effective, efficient and economical removal of whole trees and brush type vegetation (referred to herein as vegetative targets T) by taking advantage of the natural root base which holds the vegetative target in place and substantially vertical while the comminution drum assemblies 30, 50, 70 pass over and reduce the vegetative target to mulch by triturating the branches, limbs and trunks into small pieces which can be left on site or collected and easily transported away from the area in which the vegetative targets have been growing.

As may be seen in FIG. 1, the disclosed system and method 10 is shown as having three comminution drum assemblies 30, 50, 70. It has been found that the use of more than two substantially horizontally oriented rotatable comminution drum assemblies arranged so that a line drawn through the axes of rotation 32, 52, 72 of the comminution drum assemblies 30, 50, 70 (FIG. 3) is at an acute angle from a vertical line from the axis of rotation 32 of the uppermost comminution drum assembly 30 enables said drum assemblies to effectively comminute vegetative targets as previously described.

As may be seen in FIG. 1, the set 20 of more than two substantially horizontally oriented rotatable comminution drum assemblies 30, 50, 70 is positioned within a straddle frame 12. The combination of the set 20 of rotatable comminution drum assemblies 30, 50, 70 and the straddle frame 12 is designated by reference number 15. The straddle frame assembly 15 can be operably attached to a separate vehicle such as a tractor or excavator boom which provides the power necessary to turn the comminution drum assemblies 30, 50, 70 and to move the straddle frame assembly 15 over the ground from which vegetative targets are to be removed.

Figure 2:
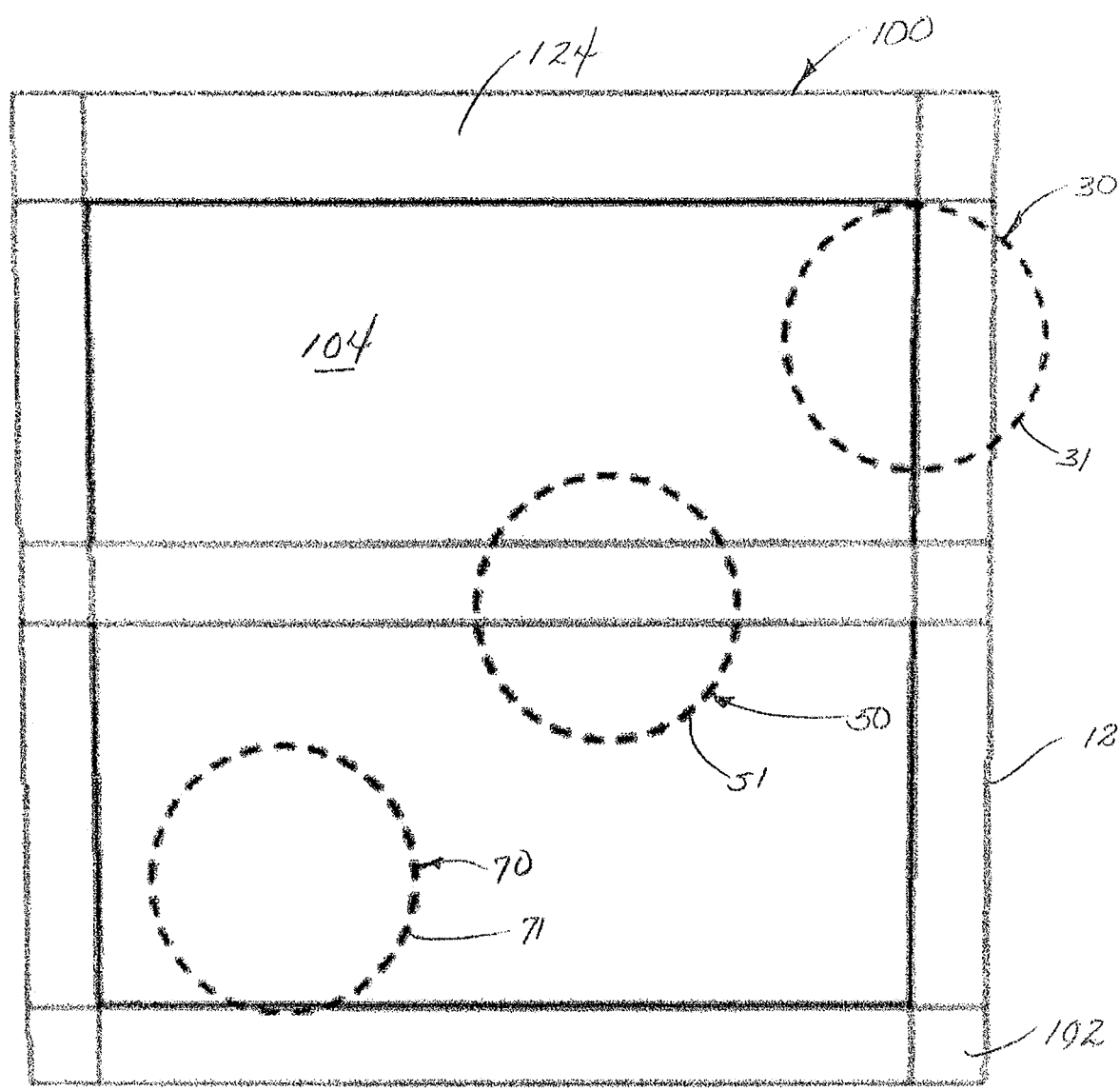
FIG. 2 is a side elevational view of the straddle frame assembly showing the arrangement of the cutting arcs of the more than two substantially horizontally oriented rotatable comminution drum assemblies within the straddle frame assembly.

Shown in FIG. 2 are the cutting arcs 31, 51, 71 which represent the paths of the tips of the knives or cutters is 40, 60, 80 affixed to the comminution drum assemblies 30, 50, 70.

As will be described below, FIG. 15 depicts the preferred embodiment 100 of the disclosed system and method 10 wherein the straddle frame assembly 15 is self-propelled. The self-propelled straddle frame assembly 100 provides the power necessary to turn the comminution drum assemblies 30, 50, 70 and to move the straddle frame assembly 15 over the ground from which vegetative targets are to be removed.

As will be explained below the self-propelled straddle frame assembly 100 may also include a portion on its rear into which the triturated woody portion of branches, limbs and trunks may pass for the purpose of collection.

Figure 3:
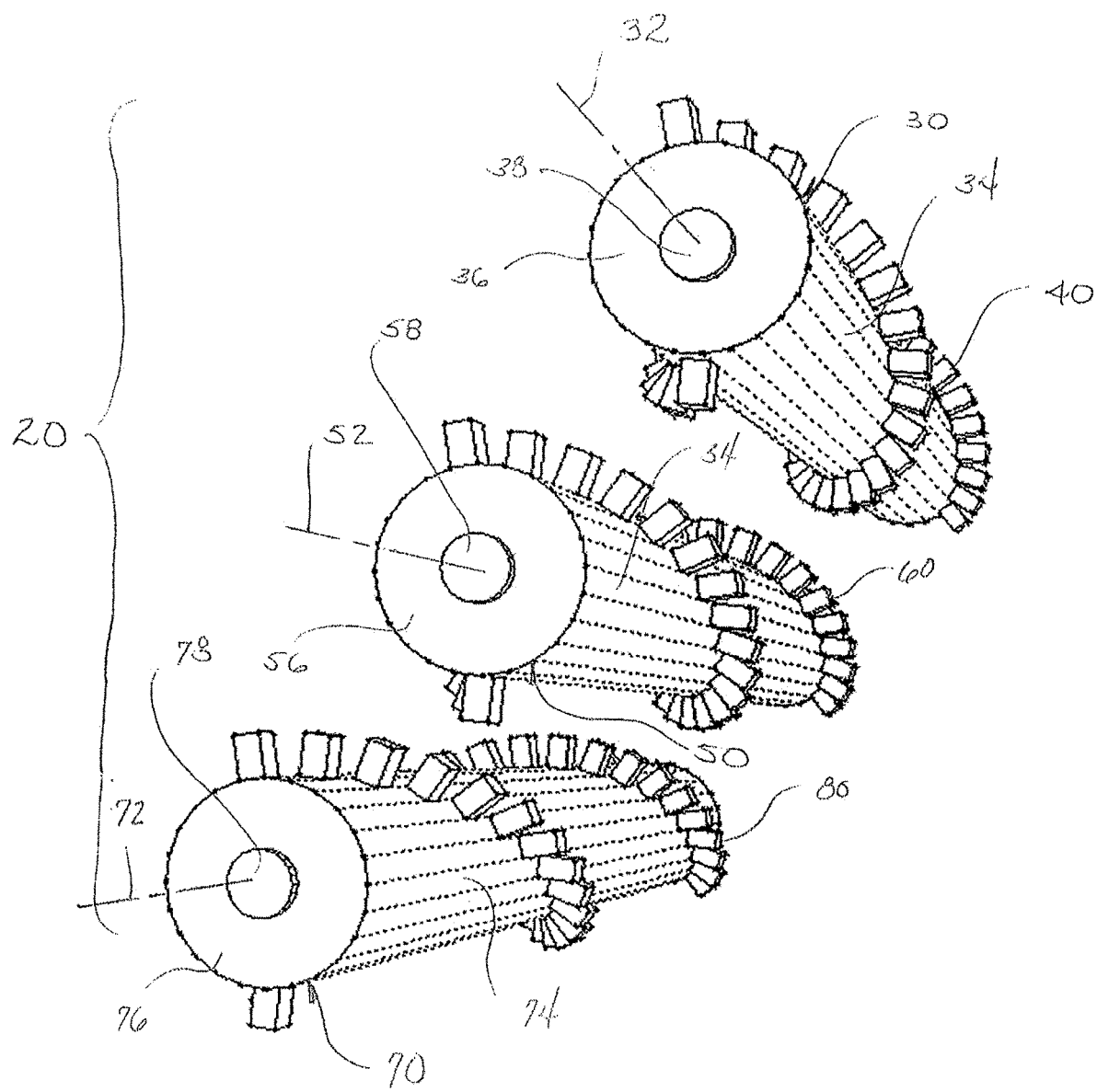
FIG. 3 is a perspective view showing the arrangement of the more than two substantially horizontally oriented rotatable comminution drum assemblies.

In FIG. 3 the set 20 of more than two substantially horizontally oriented rotatable comminution drum assemblies 30, 50, 70 is shown. Each comminution drum assembly 30, 50, 70 includes a rotation axis 32, 52, 72 about which the comminution drum assembly 30, 50, 70 turns. Surrounding the rotation axis is a substantially cylindrical portion 34, 54, 74 having an end plate 36, 56, 76 affixed thereto on either end. On each end plate 36, 56, 76 is a mounting shaft 38, 58, 78 which supports one end of the comminution drum assembly 30, 50, 70. On the other end of the comminution drum assembly 30, 50, 70 is another end plate which provides the mounting for a mounting shaft which also acts as a drive shaft to transmit rotational force to the substantially cylindrical portion 34, 54, 74.

Arrayed around the substantially cylindrical portion 34, 54, 74 are a plurality of knives or cutters 40, 60, 80. The individual knives or cutters in the array of knives or cutters may have a variety of different shapes and sizes. Shown in FIG. 3 is a matching pattern of helical arrays of uniformly shaped knives or cutters. If desired, the arrays of knives or cutters used in a set of more than two comminution drum assemblies may be fixed to said comminution drum assemblies so the cutting edges of said knives or cutters stand in opposition, as between the uppermost and middle comminution drums, for example.

Other arrays of the knives or cutters 40, 60, 80 such as straight line arrays, diagonal arrays, or staggered arrays may be used.

The shape of the plurality of knives or cutters 40, 60, 80 may include straight edges or curved edges.

The outermost diameter of the cutting arcs 31, 51, 71 of the comminution drum assemblies 30, 50, 70 in the set of the more than two substantially horizontal rotatable comminution drum assemblies 30, 50, 70 may be different; for example, the diameter of the uppermost comminution drum assembly 30 may be smaller than the diameter of the middle comminution drum assembly 50 and the diameter of the middle comminution drum assembly 50 may be smaller than the diameter of the lowermost comminution drum assembly 70. The geometry of the positioning of the comminution drum assemblies 70 will be described below.

Figure 4:
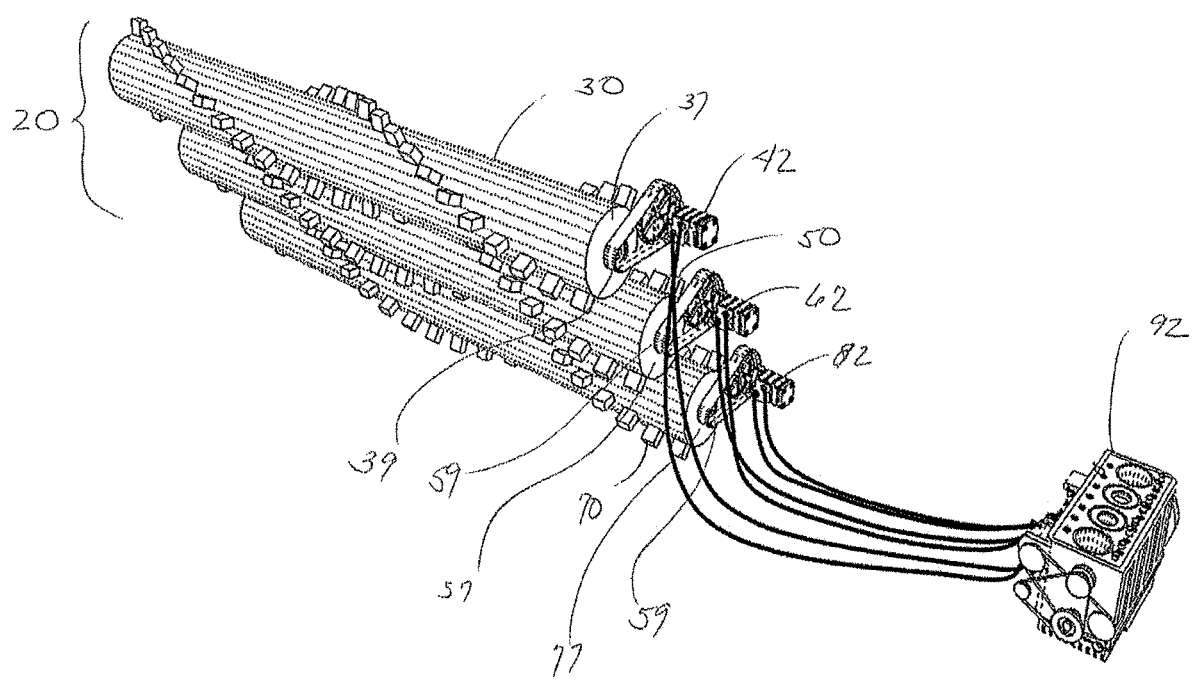
FIG. 4 is a perspective view showing the individual motors and drive systems for imparting rotational power individually to each comminution drum assembly.

Shown in FIG. 4 is the drive system 90 for the comminution drum assemblies 30, 50, 70. In the preferred embodiment a hydraulic pump 92 provides a flow of hydraulic fluid to a hydraulic motor 42, 62, 82 mounted to provide rotational power to the drive shaft 39, 59, 79 affixed to the end plate 37, 57, 77 on the substantially cylindrical portion 34, 54, 74 of each comminution rotor assembly 30, 50, 70. Herein the rotational speeds of the each one of the comminution drum assemblies 30, 50, 70 may be varied as needed to assure proper comminution of the woody portion of vegetative targets into mulch which can be easily transported through the straddle frame assembly 15 and collected for later use. Those of ordinary skill in the art will understand that electric motors receiving electrical energy from an electrical power supply may be used instead of hydraulic motors.

Figure 5:
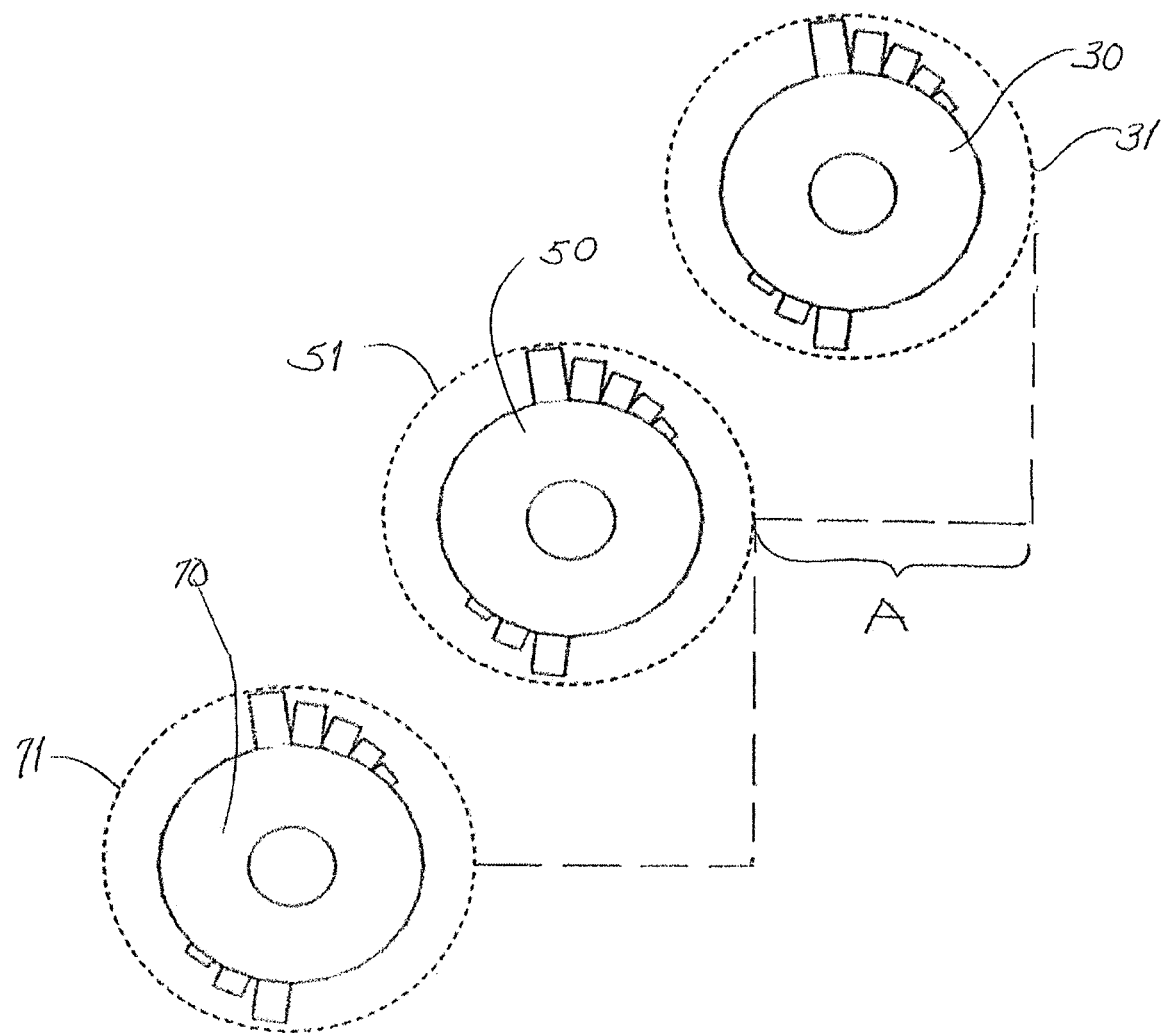
FIG. 5 is a side elevational view, showing the horizontal spacing of the set of the comminution drum assemblies, one with respect to the other.

The effectiveness of the disclosed system and method depends on the horizontal, vertical and angular geometric positioning of the more than two rotatable substantially horizontally oriented rotatable comminution drum assemblies 30, 50, 70, one with respect to the other. Shown in FIG. 5, the positioning of the comminution drum assemblies 30, 50, 70 with respect to a substantially horizontal axis is shown. As indicated above, the path of the outward edge of the knives or cutters 40, 60, 80 is called the cutting arc 31, 51, 71. Horizontally the distance A between the cutting arc of a comminution drum assembly should be no more than about 250% of the total diameter of the cutting arc of the adjacent comminution drum assembly and no less than 20% of the total diameter of the cutting arc of the adjacent comminution drum assembly. If the total cutting arc diameters of adjacent comminution drum assemblies in a set of more than two substantially horizontally oriented rotatable comminution drum assemblies differ in size, the total horizontal spacing between such adjacent comminution drum assemblies is calculated using the larger total cutting arc diameter of the two adjacent comminution drum assemblies. Those of ordinary skill in the art will understand that the horizontal spacing between comminution drum assemblies will generally be smaller for smaller trees and larger for larger trees.

Figure 6:
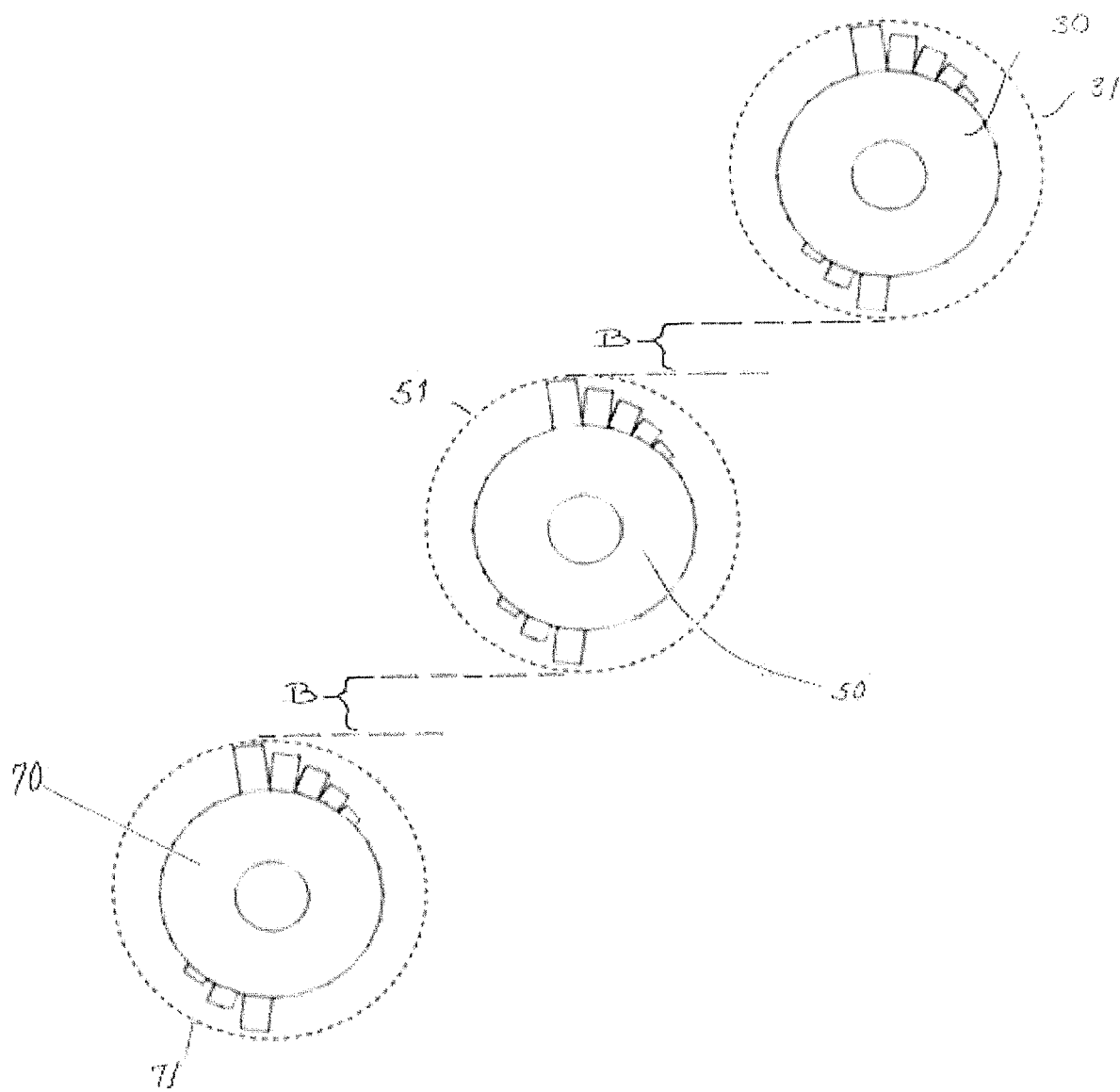
FIG. 6 is a side elevational view, in partial perspective, showing the vertical spacing of the set of comminution drum assemblies, one with respect to the other.

As shown in FIG. 6 the vertical position of the cutting arcs 31, 51, 71 of the comminution drum assemblies 30, 50, 70 should not intersect one another. Vertically the distance B between the cutting arcs 31, 51, 71 of each comminution drum assembly 30, 50, 70 should be no more than about 75% of the total diameter of the cutting arc of the adjacent comminution drum assembly. If the total cutting arc diameters of adjacent comminution drum assemblies differ in size, the vertical spacing between adjacent comminution drum assemblies is calculated using the larger total cutting arc diameter of the two adjacent comminution drum assemblies. Those of ordinary skill in the art will understand that the vertical spacing between comminution drum assemblies will generally be smaller for smaller trees and larger for larger trees.

Figure 7:
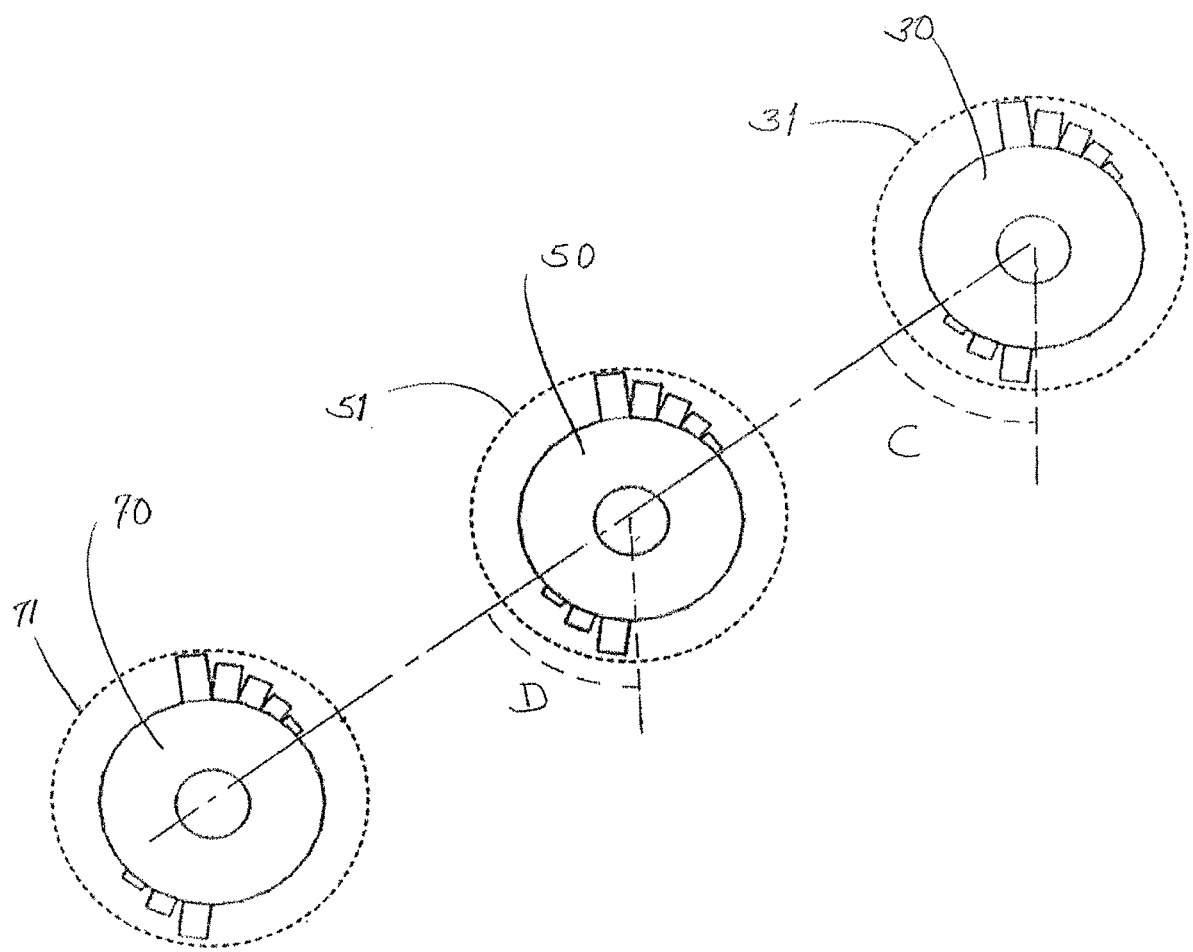
FIG. 7 is a side elevational view, showing the angular relationship of the set of comminution drum assemblies, one with respect to the other.
Figure 8:
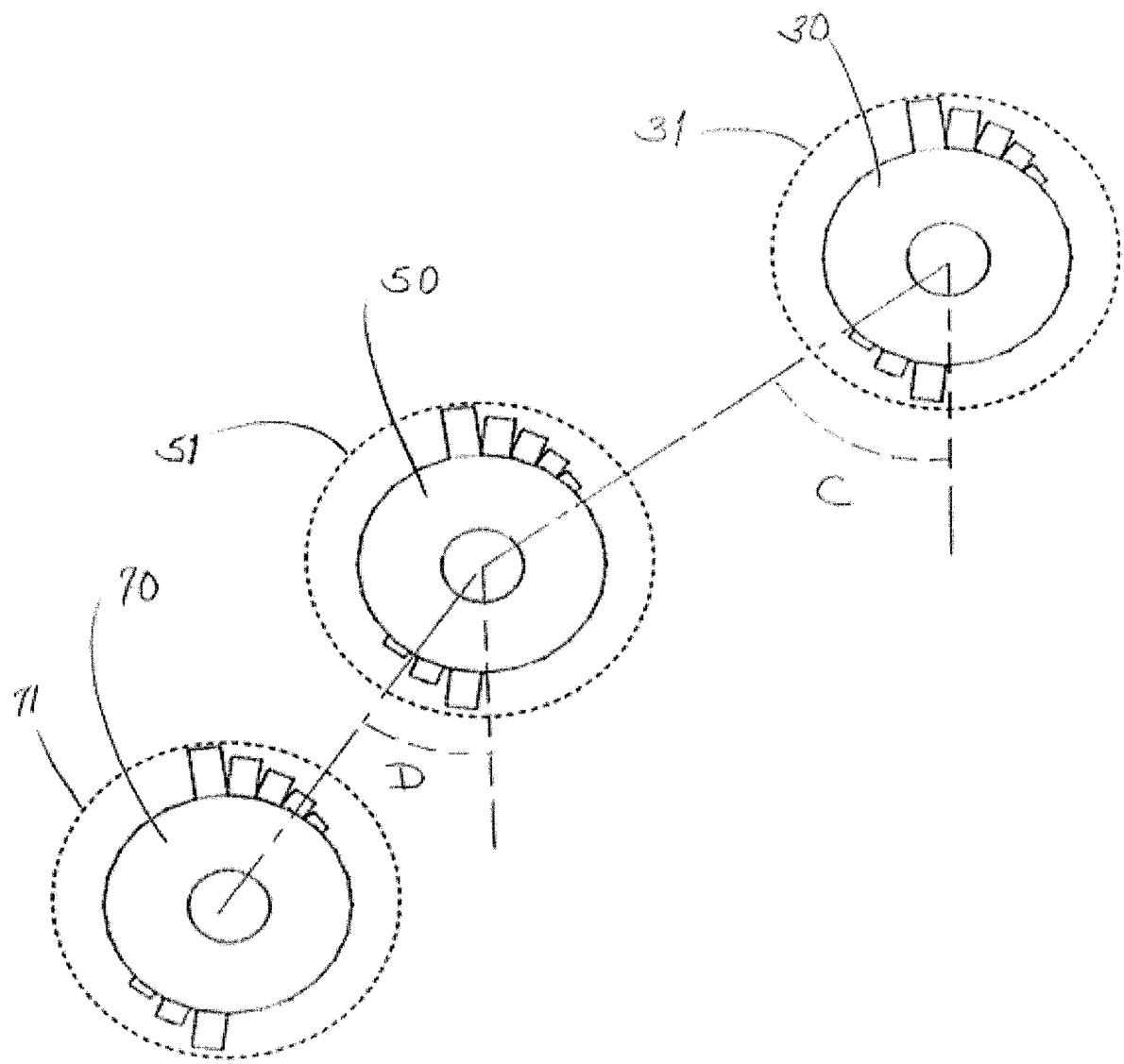
FIG. 8 is a side elevational view, showing a variable angular relationship between the set of comminution drum assemblies, one with respect to the other

The angular relationship between the comminution drums assemblies 30, 50, 70 is shown in FIG. 7. This angular relationship is shown with respect to a vertical line extending downwardly from the axis of rotation of the uppermost comminution drum assembly 30. Herein, it has been found that the acute angle C between the vertical line extending downwardly from the axis of rotation 32 of the upper comminution drum assembly 30 and a line passing through the axis of rotation 52 of the middle comminution drum assembly 50, as well as the angle D between a vertical line drawn from the rotation axis 52 of the middle comminution drum assembly 50 and the rotation axis 72 of the lowermost comminution drum assembly 70, should be from between about 10 degrees and about 70 degrees. If desired, the angle C and the angle D between comminution drum assemblies within a set of more than two rotatable comminution drum assemblies may be equal. However, as seen in FIG. 8, the angle C and the angle D between comminution drum assemblies within a set of more than two rotatable comminution drum assemblies may also be varied such that said angles each still fall between 10 degrees and 70 degrees. Such a configuration of varied angles, each being between 10 degrees and 70 degrees, will still comminute vegetative targets as intended. Those of ordinary skill in the art will understand that the angular position of the comminution drum assemblies, one with respect to the other, will generally be smaller for smaller trees and larger for larger trees.

In FIGS. 9 through 14 the operation of the set 20 of more than two substantially horizontally oriented rotatable comminution drums assemblies 30, 50, 70 is shown. As will be understood from FIG. 1, the set 20 of more than two substantially horizontally rotatable comminution drums is positioned within the straddle frame assembly 100; however, for clarity the straddle frame 15 is not shown in FIGS. 9, 10, 11, 12, 13 and 14.

Figure 9:
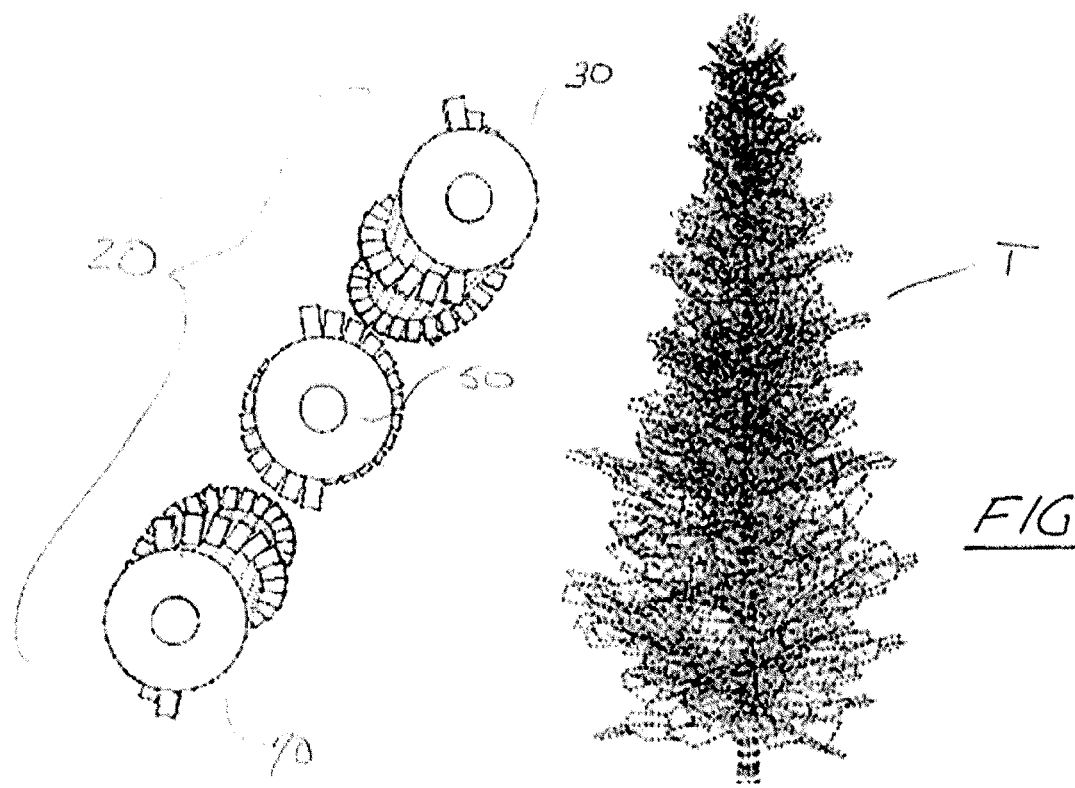
FIG. 9 is a side elevational view, in partial perspective, showing the position of the set of comminution drum assemblies as it approaches a vegetative target.

In FIG. 9, the uppermost drum assembly 30 has not yet reached the top of the vegetative target. The cutting arc 71 of the lowermost comminution drum assembly 70 is positioned to be at or near ground level so the bottom portion of the vegetative target T may be removed along with that portion of the root structure which may be just above the ground surface.

Figure 10:
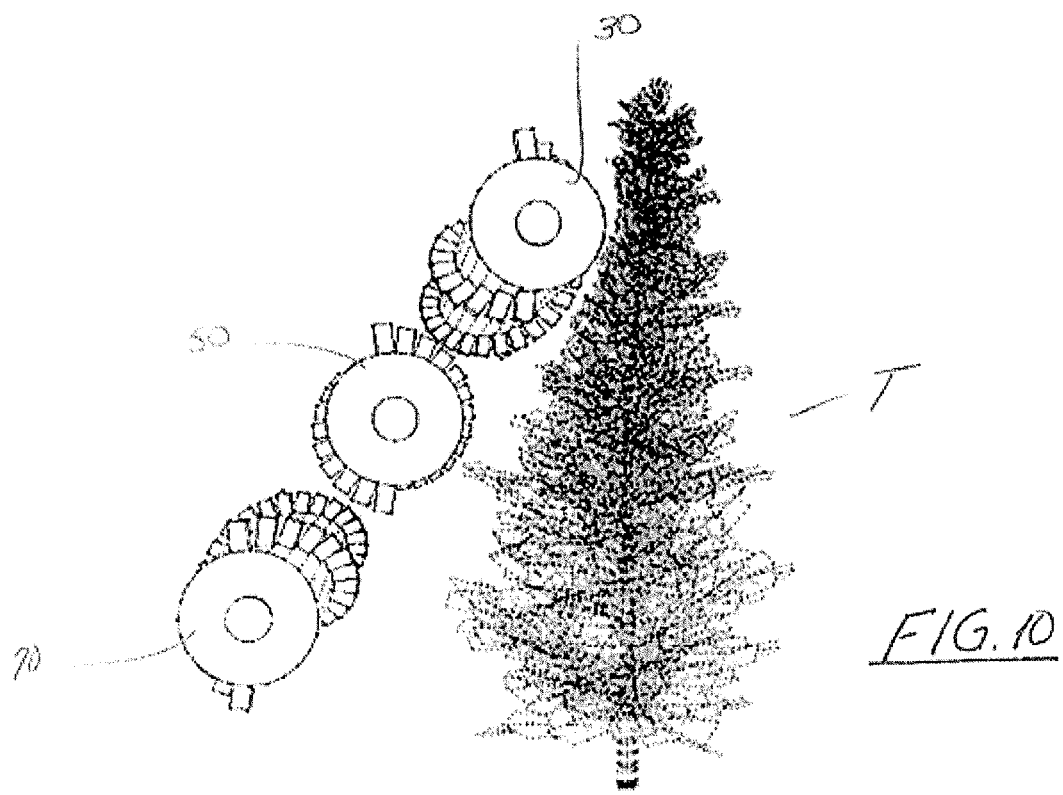
FIG. 10 is a side elevational view, in partial perspective, showing the uppermost rotatable comminution drum assembly as it engages the top portion of the vegetative target.

In FIG. 10, the uppermost comminution drum assembly 30 engages the upper portion of the vegetative target T. The angled geometric relationship between comminution drum assemblies accommodates for the forward bending of the vegetative target T that occurs when comminution drum assemblies contact dense vertical portions of the vegetative target T during the comminution process in such a way that each comminution drum assembly 30, 50, 70 is still able to triturate the vegetative target T in succession without experiencing substantial interference from the other comminution drums assemblies within the set 20.

Figure 11:
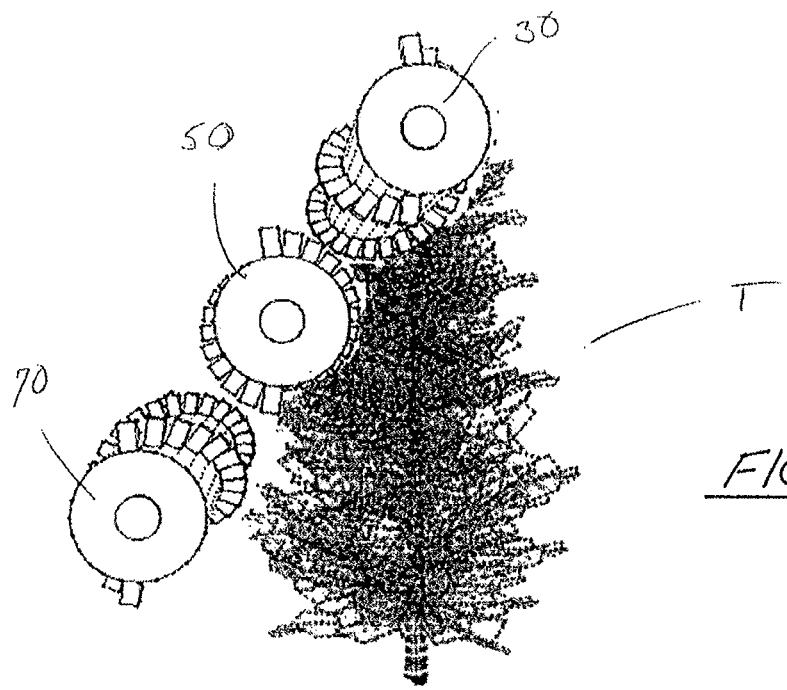
FIG. 11 is a side elevational view, in partial perspective, showing both the uppermost and middle rotatable comminution drum assemblies engaging the vegetative target.

In FIG. 11, the middle comminution drum assembly 50 begins to engage the branches and limbs near the outer edge of the whole tree or brush type vegetative target T as the upper comminution drum assembly 30 passes the substantially vertical axis of the vegetative target T. The trunk that supports the limbs and branches is the densest part of the vegetative target and, accordingly, the rotational force required to comminute the trunk is greater than the power needed to comminute the smaller limbs and branches that stick out therefrom. As the uppermost comminution drum assembly 30 comminutes the dense substantially vertical portion of vegetative target it employs a higher level of rotational force than the comminution drum assemblies below that have yet to reach the substantially vertical axis and only require lower levels of rotational force to effectively comminute the outer portions of the vegetative target T.

Figure 12:
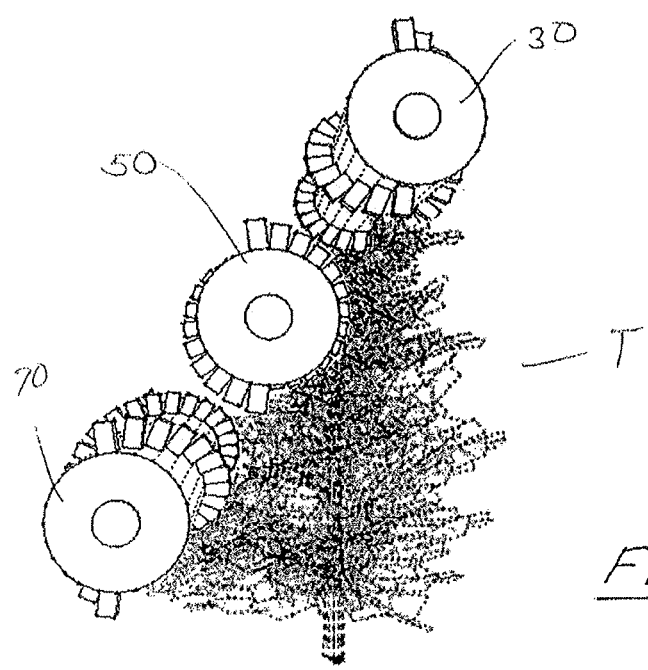
FIG. 12 is a side elevational view, in partial perspective, showing the uppermost rotatable comminution drum assembly moving past the top of the vegetative target and the middle and lowermost comminution drum assemblies engaging the vegetative target.

In FIG. 12, the uppermost comminution drum assembly 30 has passed substantially through the upper portion of the whole tree or brush type vegetation target T and the middle comminution drum assembly 50 has engaged the central portion of the vegetative target T where the branches, limbs and trunk are thicker. Accordingly, the amount of rotational force needed to cut up the top of the vegetative target T has been reduced for the uppermost comminution drum assembly and highest level of rotational force is now used to turn the middle comminution drum assembly 50 against the branches, limbs and trunk in the middle of the vegetative target T. The lowermost comminution drum assembly 70 now begins to engage the smaller branches and limbs on the bottom of the vegetative target T.

Figure 13:
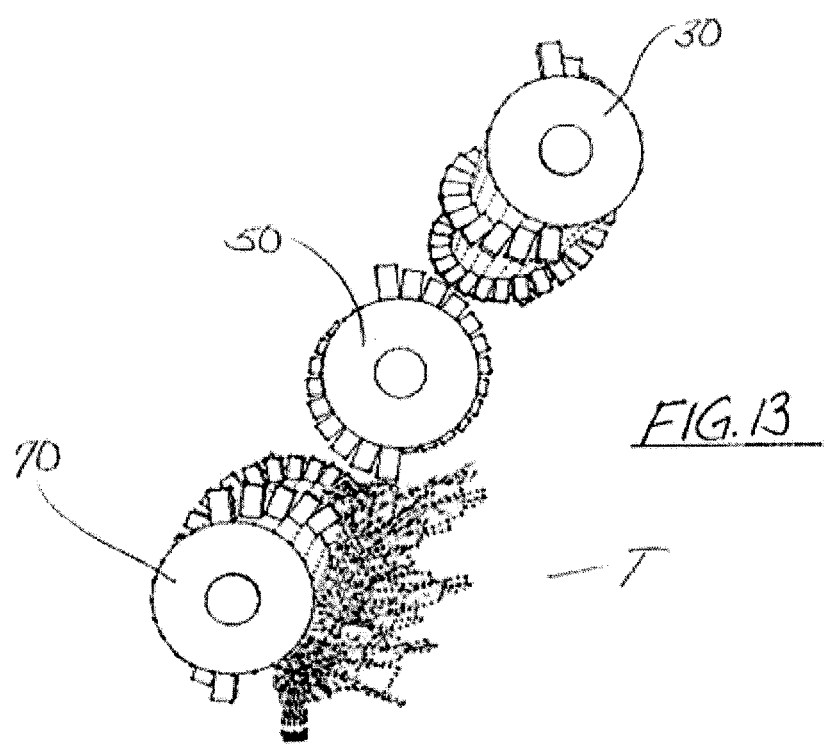
FIG. 13 is a side elevational view, in partial perspective, showing the uppermost and middle rotatable comminution drum assembly moving past the vegetative target and the lowermost comminution drum assembly engaging the bottom of the vegetative target.

In FIG. 13, the uppermost comminution drum assembly 30 and the middle comminution drum assembly 50 have cut away the top and middle portions of the whole tree or brush type vegetation target T. The lowermost comminution drum assembly 70 now engages the trunk at the bottom of the whole tree or brush type vegetation target T. Accordingly, minimal rotational force is needed for the uppermost 30 and middle 50 comminution drum assemblies and the highest level of rotational force is used to turn the lower comminution drum 70 against the branches, limbs, and trunk near the bottom of the vegetative target T.

Figure 14:
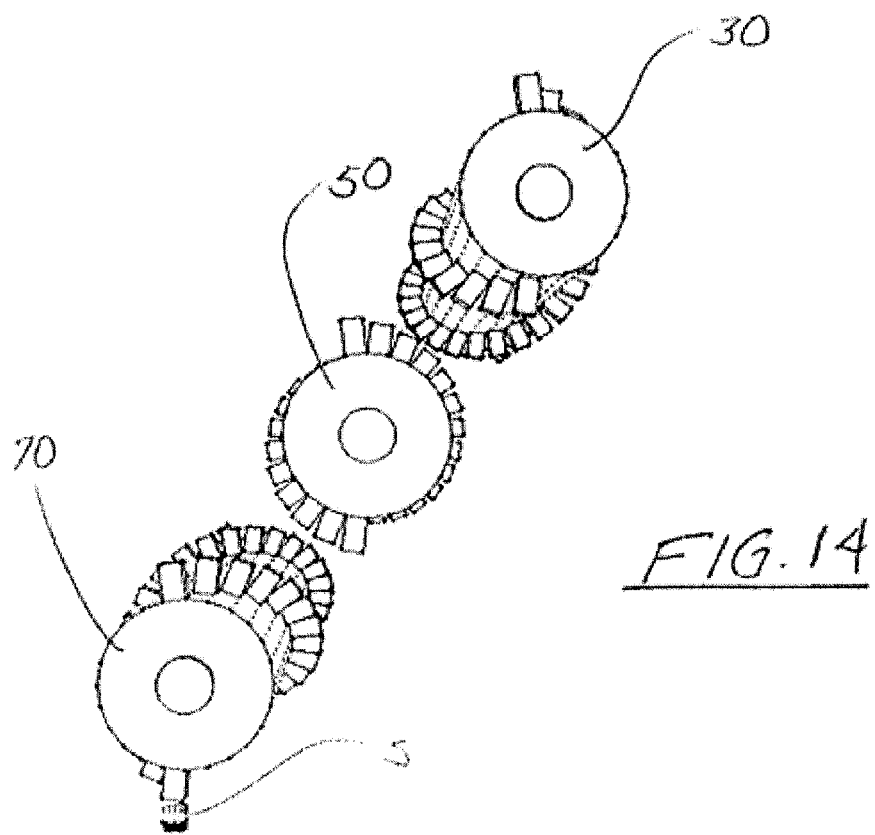
FIG. 14 is a side elevational view, in partial perspective, showing the lowermost rotatable comminution drum assembly engaging the stump of the vegetative target.

Finally, in FIG. 14, the top, middle, and bottom of the whole tree and brush type vegetation target T have been removed and the rotational force of the lowermost comminution drum assembly 70 is used to cut off the stumps at ground level.

Shown in FIG. 15 is a side perspective of the preferred embodiment of the invention comprised of a self-propelled straddle frame assembly 100 including the set 20 of more than two substantially horizontal rotatable comminution drum assemblies 30, 50, 70 as described above. The self-propelled straddle frame assembly 100 is formed in the shaped of an upside-down U as may be seen by reference to FIG. 17. On either side of the self-propelled straddle frame assembly 100 are substantially parallel side walls 102. Within the substantially parallel side walls 102 are panels 104 which contain the mulched woody materials produced as the set 20 of more than two comminution drum assemblies grind up the branches, limbs and trunks of the whole trees and brush type vegetation being removed. Connected in a substantially perpendicular orientation to the substantially parallel walls is a roof or upper base 124 portion.

On each corner of the self-propelled straddle frame assembly 100 is a drive wheel assembly 128. Each drive wheel assembly 128 may be separately rotated to control the speed of the self-propelled straddle frame assembly 100 and separately angularly aligned to control the direction of travel. If desired, a track assembly may be used instead of a drive wheel assembly.

On top of the roof or upper base 124 is an operator's cab 200. Such operator's cab 200 may also be placed on the side of the self-propelled straddle frame assembly 100. Also placed on the roof or upper base 124 is the power system 210 which drives the wheel assemblies 128, the sets 20 of one or more comminution drum assemblies and any other auxiliary equipment mounted on the self-propelled straddle frame assembly 100.

In an alternate embodiment, the self-propelled straddle frame assembly 100 may be remotely controlled by an operator and the position of the vehicle determined by a GPS system.

Located at each of the four corners of the self-propelled straddle frame assembly 100 is an adjustable strut assembly 129. Each adjustable strut assembly 129 may be positioned to keep the self-propelled straddle frame assembly 100 level on a sloped surface or enable reducing the height of the entire self-propelled straddle frame assembly 100 to stay beneath the maximum load height requirements when placed on the surface of a flat-bed trailer for transport as shown in FIG. 16.

In the alternate embodiment, as shown in FIG. 17, multiple sets 320, 420 of more than two substantially horizontally oriented rotatable comminution drum assemblies may be placed between the substantially parallel side walls 102 of the self-propelled adjustable straddle frame assembly 100. The lowermost set of more than two substantially horizontally oriented rotatable comminution drum assemblies may be adjusted such that the lowermost comminution drum assembly can be lowered in order to contact ground level and also be raised to allow the assembly to clear obstacles and facilitate transportation.

In yet another alternate embodiment, as shown in FIG. 18, mulch deflector plates 522, 524, 526, 528 may be placed adjacent to and between the comminution drum assemblies to better direct the flow of mulch away from the comminution drum assemblies. Shown also in FIG. 18 is a shredder 700 at the bottom of the self-propelled straddle frame assembly 100 into which the mulch produced by the comminution drum assemblies may be directed for further reduction in size for easier transport. At the rear of the self-propelled straddle frame assembly 100 is located an enclosed elevator assembly 800 on which the mulch may be transported into a collection trailer or into an open portion of a truck following the self-propelled straddle frame assembly 100.

Shown in FIG. 19 is another embodiment in which the mulch is guided through a funnel shaped attachment 900 positioned at the rear of the self-propelled straddle frame assembly 100 for the purpose of directing mulch reward for collection in a trailer or into an open portion of a truck following the self-propelled adjustable straddle frame assembly 100.

For particularly large jobs, another embodiment is shown in FIG. 20. Herein sets 20A, 20B of more than two substantially horizontally oriented rotatable comminution drum assemblies are positioned in a frame hingedly mounted on either side the self-propelled straddle frame assembly 100 which enables the comminution drum assemblies to be angled towards the rear of the self-propelled straddle frame assembly 100.

While the present invention has been described in terms of its preferred and alternate embodiments, those skilled in the art will understand that still other embodiments may be made based on the disclosed invention. Such other embodiments shall be included within the scope and meaning of the appended claims.

I claim:

1. A device for comminuting whole trees or brushy vegetation comprising:
 a set of more than two rotatable substantially horizontally oriented comminution drum assemblies;
 said set of rotatable comminution drum assemblies being constructed and arranged in an angular orientation so that an uppermost rotatable comminution drum assembly in said set of more than two rotatable substantially horizontally oriented comminution drum assemblies first engages a top portion of the whole tree or brushy vegetation and the remaining rotatable comminution drum assemblies in said set of more than two rotatable substantially horizontally oriented comminution drum assemblies sequentially engage lower portions of the whole tree or brushy vegetation that exist below the portions of the whole tree or brushy vegetation that are comminuted by each successive drum assembly; and
 wherein a horizontal distance between comminution drum assemblies in said set of more than two rotatable comminution drum assemblies is no more than 250% of a total diameter of a cutting arc of an adjacent comminution drum assembly and no less than 20% of the total diameter of the cutting arc of the adjacent comminution drum assembly and a vertical distance between comminution drum assemblies in said set of more than two rotatable comminution drum assemblies is no more than 75% of the total diameter of the cutting arc of the adjacent comminution drum assembly.

2. The device for comminuting whole trees or brushy vegetation as defined in claim 1 wherein said rotatable comminution drum assemblies include a substantially cylindrical portion and a plurality of cutters extending outwardly therefrom.

3. The device for comminuting whole trees or brushy vegetation as defined in claim 1 wherein the rotational axes of each comminution drum assembly intersects a line from 10 degrees to 70 degrees from a vertical line passing through the axis of rotation of the adjacent comminution drum assembly.

4. The device for comminuting whole trees or brushy vegetation as defined in claim 1 wherein each comminution drum assembly is driven by an individual motor.

5. A system for comminuting a plurality of whole trees or brushy vegetation comprising:
    a self-propelled straddle frame assembly formed substantially in the shape of an upside-down U having two substantially parallel side walls and an upper base connected to said two substantially parallel side walls in a substantially perpendicular orientation;
    said self-propelled straddle frame assembly including a front portion and rear portion;
    a device for comminuting whole trees or brushy vegetation positioned within an interior and in the front portion of said self-propelled straddle frame assembly;
    said device for comminuting whole trees or brushy vegetation including:
        a set of more than two rotatable substantially horizontally oriented comminution drum assemblies;
        said set of more than two rotatable substantially horizontally oriented comminution drum assemblies being constructed and arranged in an angular orientation so that an uppermost comminution drum assembly in said set of more than two rotatable substantially horizontally oriented comminution drum assemblies first engages a top portion of a whole tree or brushy vegetation and the remaining comminution drum assemblies in said set of more than two rotatable substantially horizontally oriented comminution drum assemblies sequentially engage a lower portion of the whole tree or brushy vegetation;
    said self-propelled straddle frame assembly further including a drive wheel assembly mounted on the lower portions of said substantially parallel side walls;
    wherein said system for comminuting a plurality of whole trees or brushy vegetation moves through across the ground in which the whole trees or brushy vegetation grows; and
    wherein each rotatable substantially horizontally oriented comminution drum assembly within said set of more than two rotatable substantially horizontally oriented comminution drum assemblies is vertically positionable with respect to each other rotatable substantially horizontally oriented comminution drum assembly within said self-propelled straddle frame assembly.

6. The system for comminuting a plurality of whole trees or brushy vegetation as defined in claim 5 wherein a height of the upper base with respect to the ground is adjustable.

7. The system for comminuting a plurality of whole trees or brushy vegetation as defined in claim 6 wherein said drive wheel assembly for said self-propelled adjustable straddle frame assembly includes a first set of two individually controllable wheels positioned on the ends of said substantially parallel side wall and a second set of two individually controllable wheels positioned on the ends of the other substantially parallel side wall.

8. The system for comminuting a plurality of whole trees or brushy vegetation as defined in claim 7 wherein each of said controllable wheels is positioned under an adjustable strut for changing the elevation of said self-propelled adjustable straddle frame assembly with respect to the ground.

9. The system for comminuting a plurality of whole trees or brushy vegetation as defined in claim 5 further including an upper set of comminution drum assemblies for comminuting a top portion of whole trees or brushy vegetation and a lower comminution drum assembly including a set of one or more comminution drum assemblies for comminuting a lower portion of whole trees or brushy vegetation following the contact and engagement of the top portion of the whole trees or brushy vegetation by said upper set of comminution drum assemblies.

10. The system for comminuting a plurality of whole trees or brushy vegetation as defined in claim 9 wherein an outermost portion of a lowermost comminution drum assembly in said set of one or more comminution drum assemblies is able to adjust vertically to enable contact with the ground in which the whole trees or brushy vegetation grow.

\* \* \* \* \*